United States Patent [19]

Tisue

[11] Patent Number: 5,218,378
[45] Date of Patent: Jun. 8, 1993

[54] WRITING COMPENSATOR FOR THRESHOLDED MEDIA

[76] Inventor: James G. Tisue, 1074 Laureles Dr., Los Altos, Calif. 94022

[21] Appl. No.: 833,633

[22] Filed: Feb. 7, 1992

Related U.S. Application Data

[63] Continuation of Ser. No. 514,116, Apr. 25, 1990, abandoned.

[51] Int. Cl.⁵ .............................................. H04N 1/21
[52] U.S. Cl. .................................... 346/108; 358/298
[58] Field of Search .................. 346/108, 107 R, 160; 358/296, 300, 302, 298

[56] References Cited

U.S. PATENT DOCUMENTS

| | | | |
|---|---|---|---|
| 4,679,057 | 7/1987 | Hamada | 346/108 |
| 4,950,880 | 8/1990 | Budd et al. | 346/160 |
| 5,017,944 | 5/1991 | Kitamuro et al. | 346/108 |
| 5,018,212 | 5/1991 | Manns et al. | 382/8 |

Primary Examiner—Mark J. Reinhart

[57] ABSTRACT

A writing compensator for placing digital information or images onto film and other thresholded media using writing beams. The compensator includes a data storage unit, a pattern detector connected to the data storage unit, an exposure determination unit connected to the pattern detector, and a beam modulator connected to the exposure determination unit for providing a better controlled writing beam.

21 Claims, 5 Drawing Sheets

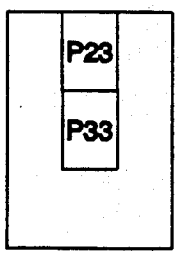 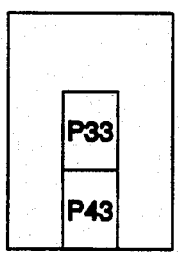 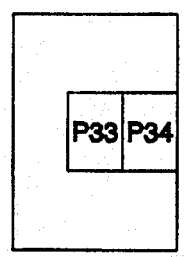 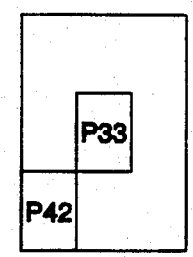 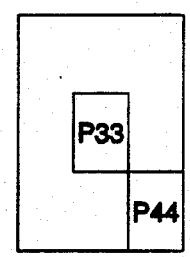
FIG. 7a    FIG. 7b    FIG. 7c    FIG. 7d    FIG. 7e
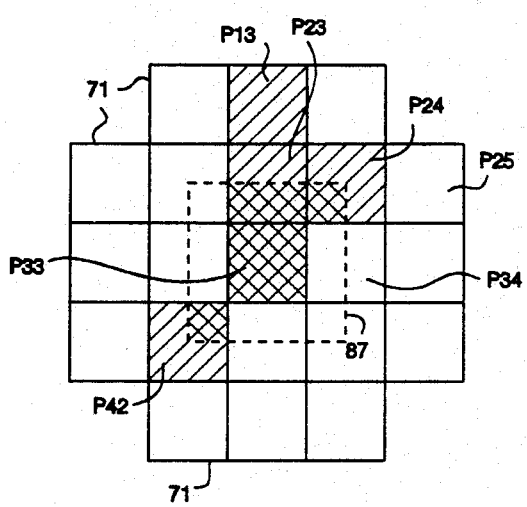 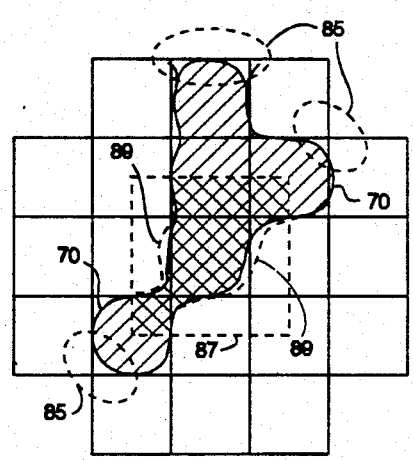
FIG. 8a      FIG. 8b
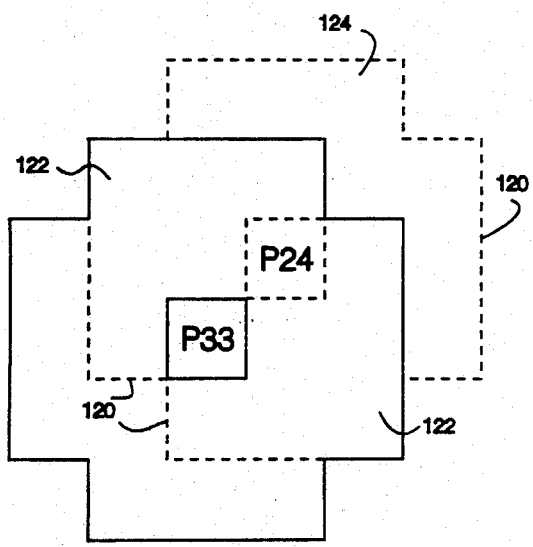
FIG. 9

WRITING COMPENSATOR FOR THRESHOLDED MEDIA

This is a continuation of application Ser. No. 07/514,116, filed Apr. 25, 1990, now abandoned.

FIELD OF THE INVENTION

This invention relates generally to techniques for placing digital information or images onto film and other thresholded media using write beams not matched to the picture elements.

DESCRIPTION OF THE PRIOR ART

There are many applications in the printing and storage of information where information, in the form of a bit map, must be placed on the media by a rastered or scanning beam. The term bit map refers to a pattern of 1's and 0's representing the plot/not plot state of the elements of the information. Thresholded media including, but not limited to, paper, photographic, magnetic and electrostatic films and coatings, cumulatively accepts the energy of the beam at each point of the image but remains basically unchanged until a threshold is reached. When the threshold is reached at any location, the image or latent image at that point of the media switches to another state—for film, the exposed state. The information, usually in a raster form, is thus transferred to the media. An additional process of development may be necessary to bring the latent or exposed image to its final more useable form. In a practical system, the need exists to write as much information as possible onto a given area of the media. The pixels, or picture elements, are rectangular and relatively small while the beam is larger, and is usually round or elliptical. The beam typically lacks edge definition and is usually Gaussian or near Gaussian in spatial distribution.

In the prior art, this mismatch between the sizes and shapes of the writing beam and the pixel causes improper printing. Additional effects occur due to the motion of the beam while writing. The effects are significant for small writing beams but get much worse as the beam becomes large compared to the pixel. The net result is that the printing size and shape of one pixel is dependent on whether adjacent pixels were printed or not. FIG. 1b shows a typical beam profile 20 along the scanning path 25 including a pixel width 33 when the beam is centered on the pixel. The areas 24 fall onto spaces occupied by other pixels. The printing of the pixel 33 is typically performed by moving the beam across the pixel turning the beam on at one edge 26 and off at the other edge 28.

FIGS. 1a and 1c show the beam and pixel at the beginning and end of the printing of pixel 33. The actual exposure is determined by the summation of the energy of all the beam positions in between. While descriptions are in terms of printing of information, the concepts associated with information storage on thresholded media are similar.

FIGS. 2a and 2b are plan views showing the typical results of printing pixel 33. FIG. 2a results when printing pixel 33 by itself and FIG. 2b results when pixel 33 is printed together with pixels 30, 31, and 32. The paths followed by the write beam center are shown by dashed arrows 46 and 48.

In FIG. 2a the beam is turned on at 26 and off at 28. For FIG. 2b the writing beam is on from point 38 to point 28 and point 41 to point 42. Hatched areas 44a and 44b are the pixel areas printed for ideal pixel 33 and should both equal one pixel. The area 44b is larger because it is helped by the writing beam overlaps when printing pixels 30 through 32.

Increasing the overall amplitude of the writing beam will improve the printing of the pixel 44a, but pixel 44b then overprints as do other patterns, especially in those cases where a single pixel is not to be printed but is surrounded by printed pixels. For mismatched beams and pixels no single amplitude of the writing beam prints all patterns correctly.

Several techniques have been utilized to improve printing with these beams. One approach uses beams imaged to the pixel shape minimizing the overlap described above. These systems suffer from poor depth of focus and poor light efficiency. They are also overly complex, expensive, and lose the advantages offered by laser light sources.

Some systems improve the printing by using very small beams. This approach achieves some success but is also expensive, complex, and has a poor depth of focus. Potential spaces in between raster lines and increased sensitivity to exact beam positioning are additional problems in such systems.

Printing has also been enhanced by varying the beam turn on and off positions based on the exposure state of the previous and following pixels. For example in FIG. 2a, pixel 33 with exposed area 44a can be improved by turning its beam on at 49 and off at 50. The difficulty in determining the modified exposure timing points 49 and 50 and the further complication of the effects of the adjacent raster lines have allowed only moderate success for this approach.

SUMMARY OF THE INVENTION

It is therefore a primary objective of the present invention to print patterns which produce the same effect as the exact bit map intended.

It is another objective to enable the exposure of an area independent of whether surrounding pixels are printed or not.

It is another objective to provide independent control of the exposure value in fully exposed areas of an image and to reduce the sensitivity of the image to beam position jitter.

It is another objective to allow printing of a particular raster spacing with much larger beams.

It is another objective to simplify system design by allowing larger beams with greater depth of focus, simpler lenses, and reduced positional accuracy.

It is another objective to provide a means of faster printing because of reduced scanning raster spacing requirements.

It is another objective to provide improved quality of printing to enable the processing of color images.

It is another objective to provide more accurate printing while utilizing write beams of differing sizes and energy distributions and pixels of different shapes.

It is another objective to provide a means of increasing the density of stored information on thresholded media.

According to the present invention, a writing compensator for thresholded media, is provided which includes data storage means, pattern detection means, exposure determination means and beam modulation means.

Raster data is preferably stored in data storage means such that the pattern of pixels printed or to be printed surrounding a presently printing pixel is determined. Raster data may be serial or non-serial form.

The pattern of pixels is fed to a pattern detection means including translation from the input set of surrounding patterns to a preferably smaller set of coefficients. Each of the coefficients includes all known patterns with similar exposure characteristics and is fed to an exposure determination means. The exposure determination means provides a beam parameter for each input coefficient to beam modulation means, controlling the writing beam. The writing beam thus is responsive to the pattern of surrounding pixels when writing each pixel.

Among the advantages of the invention is that the pattern written maintains the same areas as the input bit map essentially independent of pixel size and shape and writing beam size and shape.

These and other objects of the present invention will become apparent to those skilled in the art upon reading the following detailed disclosure of the preferred embodiments as shown in the several figures of the drawing.

BRIEF DESCRIPTION OF THE DRAWINGS

FIGS. 7a to 7e is a diagram showing further details of operation of the pattern detection means of FIG. 3.

FIGS. 8a and 8b are diagrams showing pixel plots used with exposure determination means of FIG. 3 representing an, a) ideally plotted bit map, and b) actual plotted results.

FIG. 9 is a diagram used in calculating tables for the exposure determination means of FIG. 3.

DESCRIPTION OF THE PREFERRED EMBODIMENT

Proper writing of a pixel pattern is typically hampered by:

a.) the mismatch between writing beam and pixel shapes b.) the spatial distribution of the writing beam, typically the Gaussian distribution of a laser beam, and c.) the smearing of the information because of beam motion during the writing of a pixel.

Figures 1A, 1B, 1C:
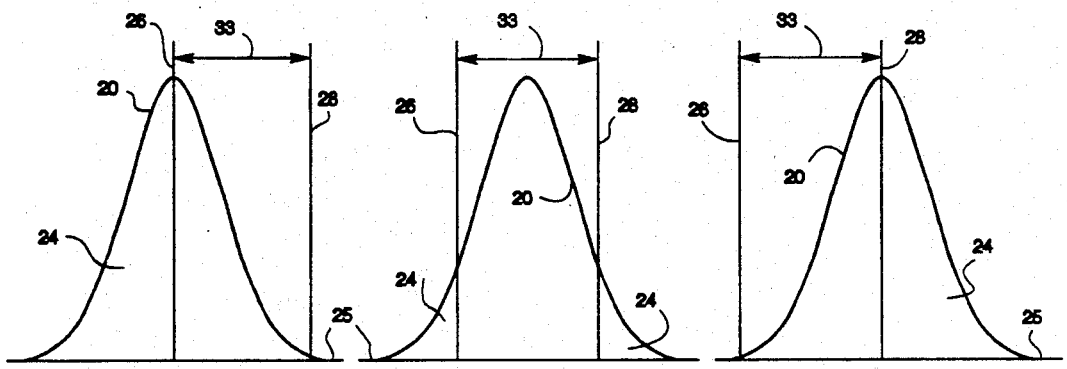
FIGS. 1a, 1b, and 1c are waveforms showing a Gaussian intensity distributed beam in the prior art, a) when exposure begins at a pixel edge, b) when the beam is centered on the pixel and c) when exposure terminates at the pixel edge.
Figures 2A, 2B:
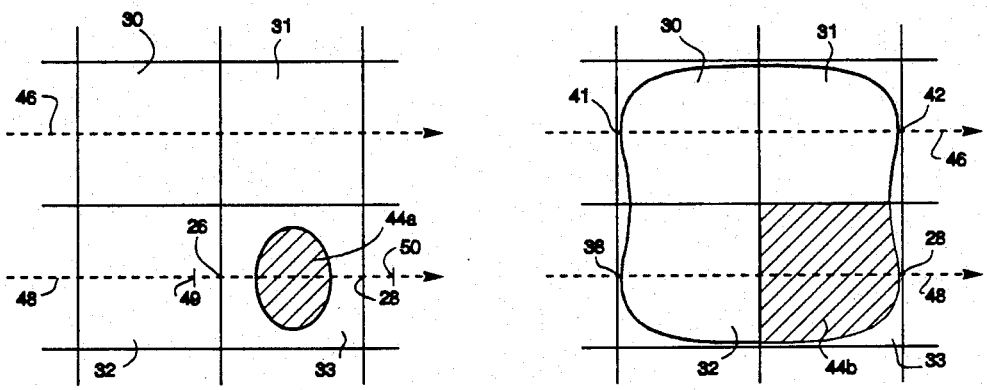
FIGS. 2a and 2b are diagrams showing exposure results in the prior art, a) when exposing one pixel and b) when exposing four pixels.
Figure 3:
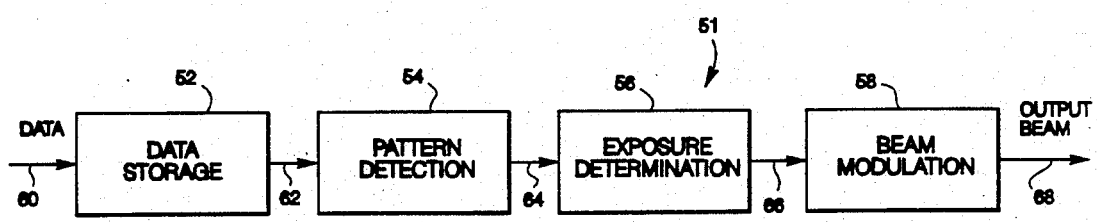
FIG. 3 is a block diagram showing data storage means, pattern detection means, exposure determination means, and beam modulation means of the present invention.

Referring to FIG. 3, a writing compensator for thresholded media 51 according to the present invention in a preferred embodiment includes a data storage means 52 operating on a source of data 60, a pattern detection means 54, an exposure determination means 56, and a beam control or modulation means 58 producing a resultant writing beam 68. Data storage means 52 typically raster or single scan line data on line 60. Said storage means provides multiple line storage such that for a particular pixel being written, the pixel pattern of the surrounding pixels is always available as preferably digital data on output lines 62.

Figures 4, 5, 6:
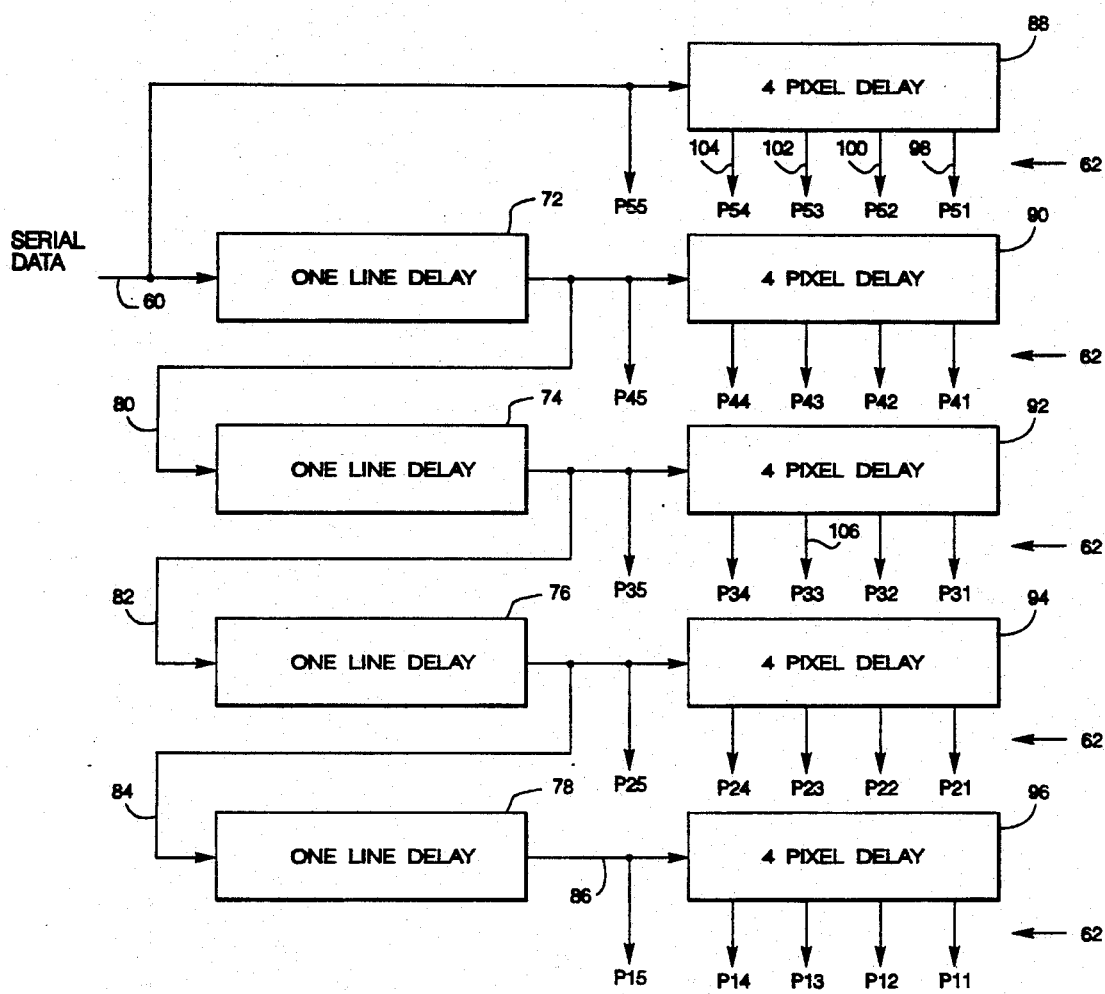
FIG. 4 is a block diagram which shows details of the FIG. 3 data storage means.
FIG. 5 is a diagram which shows the relative positions of the plot pixel and surrounding pixels as produced by the data storage means of FIG. 4.
FIG. 6 is a diagram showing details of the operation of the pattern detection means of FIG. 3.

FIG. 4 illustrates an embodiment of a data storage means which provides the pattern of pixels within two pixels of the pixel being written. FIG. 5 illustrates and identifies a matrix of relative pixels as they might appear somewhere within an image.

Refer to FIGS. 4 and 5 for the following discussion. Shift registers 72, 74, 76, and 78 provide one line delays of the serial input data 60. Therefore, delay outputs 80, 82, 84, and 86 contain pixel data at the same position along raster lines exactly one line apart. Providing that the raster data is supplied in horizontal lines from left to right and top to bottom in FIG. 5, then pixel P55 will appear on serial data line 60 while pixel P45 will appear on line 80, the scan line immediately above. P35, P25, and P15 then, similarly, appear on lines 82, 84, and 86, respectively.

Additional 4 bit shift registers 88, 90, 92, 94, and 96 shifted once each pixel time provide additional individual delay of 1 through 4 pixels. Shift register 88 outputs on lines 98, 100, 102, and 104 and represents in FIG. 5 pixels P54, P53, P52, and P51 while line 60 contains pixel P55. Similarly the outputs of registers 90, 92, 94, and 96 provide the remainder of pixels in FIG. 5 surrounding a central pixel P33 on line 106.

The bit map of 25 pixels shown in FIG. 5 can be thought of as a moving matrix within the image. Pixel P33 on line 106 of FIG. 4 is the central pixel and is the pixel currently being written. For purposes of this and the following discussions P33, the pixel being written, will be referred to as the plot pixel. The remaining pixels P11 through P55 except pixel P33, represent the printing pattern for which pixel P33 is to be compensated.

Lines 62 in FIG. 3 of data storage means 52 provides the pixel being plotted and the pixels surrounding the plot pixel.

In the cases where the data source is already in the form of lines 62 suitable for application to the pattern detection means 54, data storage means 52 would then be unnecessary. As will be explained further, the specific number of surrounding pixels required to compensate for the plot pixel P33 will vary dependent on relative pixel and beam sizes and shapes.

Pattern detection means 54 inputs a plot pixel and a set of surrounding pixels on lines 62. Because of pattern symmetries, considerable redundancy exists within the patterns of surrounding pixel exposures for purposes of compensating plot pixel P33. Pattern detection means 54 provides on its output lines 64, a unique preferably digital expression, for each set of input patterns for which the same exposure would be appropriate. Preferred embodiments for this function would include combinational logic or table lookup.

For purposes of this and following discussions each output expression on lines 64 will be referred to as a coefficient (as in plotting coefficient) to distinguish it from pixel patterns on lines 62. Thus, for example, 1000 different pixel patterns on lines 62 may result in 200 coefficients on lines 64. All input patterns which require the same exposure compensation preferably produce the same output coefficient.

The specific table or logic required will vary with beam and pixel size and shape but may be determined by using a few simple concepts.

First, input patterns need only include surrounding pixels whose plotting energy would spill significantly into the region near the plot pixel. For instance, a very large beam relative to pixel size would need to include patterns containing all of the pixels depicted in FIG. 5 and perhaps beyond. A small beam might require only the eight pixels immediately adjacent to the plot pixel. In a further example, referring to FIG. 6, narrow pixels may require patterns including two adjacent pixels horizontally and only one vertically. The inclusion of too many patterns resulting in a larger number of output coefficients on lines 64 will increase complexity but will not introduce inaccuracies. Reducing the number of pixels included in input patterns on lines 62 desirably reduces the number of coefficients on lines 64.

A reduction in the number of coefficients is effected by combining input patterns which require the same correction because of pattern symmetry. FIGS. 7a–e depict a few obvious examples of symmetry for horizontally and vertically symmetrical beams. In said figures a portion of the matrix in FIG. 5 is shown and only pixels being plotted are noted. In FIG. 7a pixels P23 and P33 by inspection have the same overlap characteristics as pixels P43 and P33 in FIG. 7b. FIGS. 7a and 7b, therefore, represent input patterns which have the same writing overlap and should be represented by the same coefficient. FIG. 7c, on the other hand, typically results in a coefficient different from the coefficient of FIGS. 7a and 7b both because of pixel shape and pixel motion during plotting. The special case of square or round beam plus square pixel would allow inclusion of patterns like that in FIG. 7c in the coefficient for FIGS. 7a and 7b. For similar reasons patterns like those in FIGS. 7d and 7e can be combined in the same coefficient.

A failure to maximally combine patterns into coefficients does not introduce errors in the final printed results.

In cases where a pattern source exists with patterns in the form of the patterns on lines 62 of FIG. 3 and the patterns are suitable for direct application to the coefficient input lines of exposure determination means 56, then the pattern detection means 54 is unnecessary.

Again referring to FIG. 3, the exposure determination means 56 preferably comprises a lookup table with input lines 64 and output lines 66. Input lines 64 preferably represent the smallest set of surrounding pixel patterns which have uniquely different exposure requirements. Each preferably digital input on lines 64 referred to as a coefficient results in an output value on lines 66. This and following discussions shall refer to the output of exposure determination means 56 on lines 66 as exposure values.

Except for the special case where the writing beam exactly matches pixel size and shape, the plotted image cannot match the intended bit map. It is the primary purpose of this invention to enable the final plot to match the effect of said bit map. This will generally be achieved if the areas written are the same as the areas required by the bit map.

The wide variety of practical pixel and beam formats precludes the tabulation of exposure values for inclusion in exposure determination means 56. A different set of exposure values must be used for each significantly different pixel and beam format.

The method of computing the exposure value will be made clear by first examining a particular coefficient in the preferred embodiment. Referring to FIG. 8a, a set of pixels representing the vicinity of the plot pixel P33 is shown. This set of pixels is a subset of the pixels in FIG. 5. Specifically pixels P11, P15, P51, and P55 have been eliminated by pattern detection means 54 as being too far from the plot pixel P33 to influence its exposure in this particular case. Coefficients on lines 64 of exposure determination means 56 only involve the 21 pixels within the outline 71. For illustrative purposes a specific coefficient consisting of pixels P13, P23, P24, and P42 in addition to the plot pixel P33 is selected and shown hatched in FIG. 8a. Other pixels, such as P25 and P34 are non-printing pixels. For this and subsequent discussions, the group of pixels within outline 71 except P33, the plot pixel, will be referred to as the background pixels. The patterns of each coefficient are thus made up of combinations of exposures of background pixels which have in common similar plotting errors and compensation requirements. Each coefficient fully defines the plot status of all of the background pixels.

FIG. 8b shows the resulting plot shape 70 after exposure at an arbitrary level and development, if necessary, of the bit map represented by FIG. 8a. The resultant shape 70 would also be affected by the exposure of pixels outside the border 71. This is especially true of the region within dotted lined areas 85 which actually touch pixels outside those defined by the coefficient. The plot shape in the vicinity of the plot pixel is minimally affected by said outside pixels because of the larger distances from their plot positions. The exposure shape and area in the vicinity of the plot pixel is determined primarily by the background pixel exposure pattern and background pixel exposure values.

Arbitrarily increasing the exposure value of the plot pixel P33 would result in the larger area within dotted curve 89. Reducing exposure of P33 has an opposite effect. Thus, if the background pixel exposures were known and correct, a value for the plot pixel P33 could be iterated to a value where the total exposure area is correct, thus achieving the desired end result.

The iteration process can be further enabled by the selection of a computational area such as that within the dashed line 87 in FIGS. 8a and 8b preferably down the center of the pixels surrounding the plot pixel. This area is large enough to include most of the effects of the plot pixel but small enough to be unaffected by pixels outside border 71 which are undefined by the coefficient pattern. In this and further discussions, the ideally plotted area inside dashed line 87 of FIG. 8a shall be referred to as the ideal area. Correspondingly, the area above threshold and inside the dashed line 87 of FIG. 8b shall be referred to as the actual area. In this example, the actual area is influenced primarily by P33, partly by P23, to a smaller degree by P24 and P42 and slightly by P13. The ideal and actual areas in FIGS. 8a and 8b are shown crosshatched.

Although the procedure defined above allows the calculation of each exposure value given that exposure values for all of the background pixels were known, in practice all coefficients must be calculated together in a multiple coefficient iterative process. To that end refer to FIGS. 8a and 8b and recall that the exposure value for pixel P33 can be calculated if the exposure of background pixels P13, P23, P24, and P42 are known. The exposure value for P24 for instance will depend on its respective coefficient.

Refer to FIG. 9, a slightly modified version of FIG. 8a. Pixel P24 is the plot pixel for typically another coefficient defined by its background pixels inside a dashed border 120 similar to border 71 except appropriately offset. The pixel P24 coefficient is partly defined by pixels in areas 122 and pixel P33. On the other hand, pixels in area 124 of FIG. 9 are undefined by the coefficient of P33, the current calculation. In this and subsequent discussion, in areas like area 124, pixels will be referred to as border pixels. The exposure status of border pixels must be assumed in order to define the exposure of background pixel used in iterating the exposure value of the plot pixel P33.

Preferably, the exposure value of each background pixel is calculated by averaging the exposures of said pixel for all combinations of border pixels. Referring to FIG. 9, background pixel P24 has 7 border pixels 124 and therefore its exposure would be the average of 128 values. The specific assumption concerning border pixel exposures is not of critical importance since the actual exposure of said border pixels affects the P33 computational area primarily through the values assigned to background pixels such as P24 and not directly. Alternately, border pixels could be assigned single or multiple arbitrary patterns.

Figure 10:
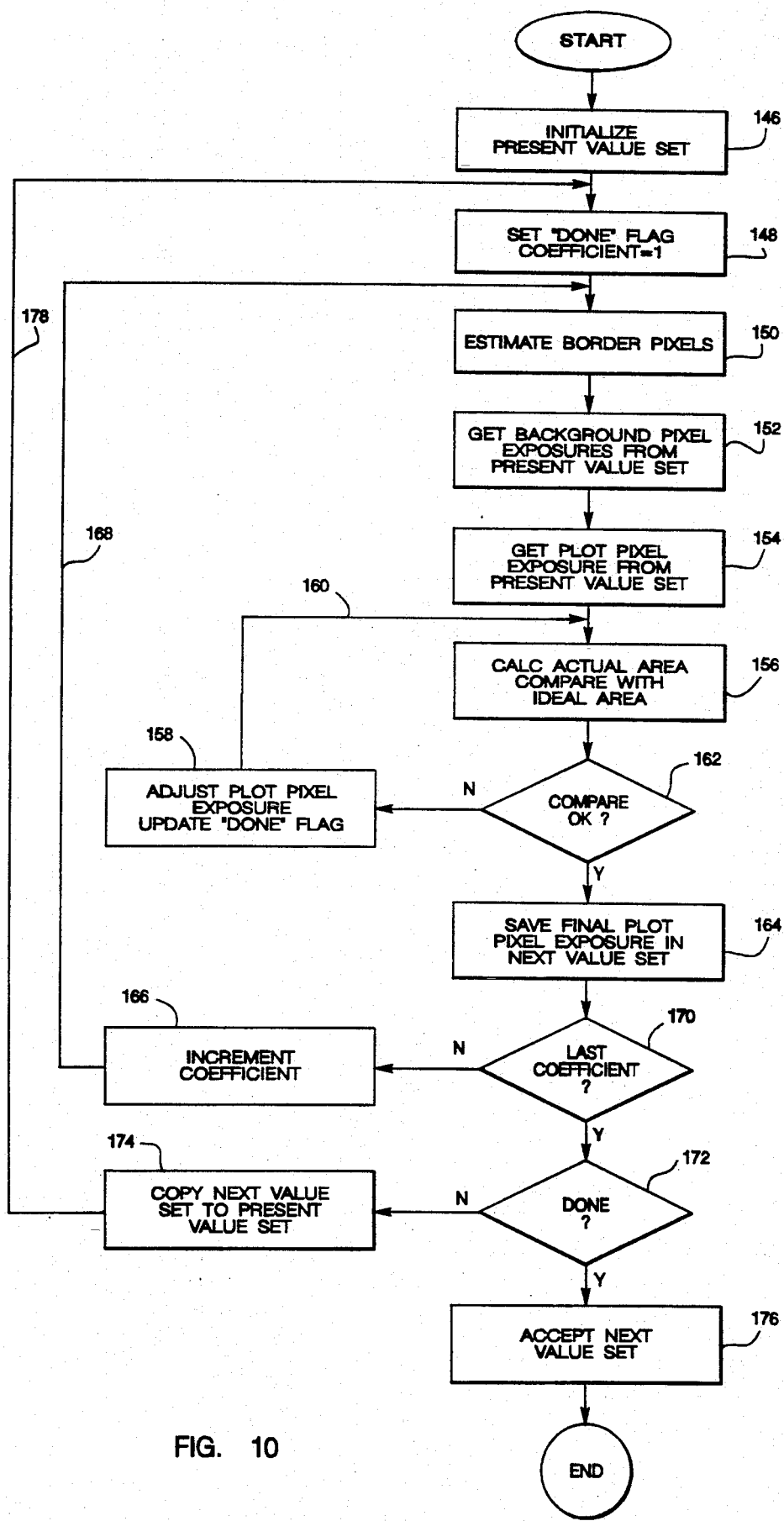
FIG. 10 is a flow chart for calculating tables for the exposure determination means of FIG. 3.

FIG. 10 is a flowchart of a preferred method of calculation of pixel exposure values for use in exposure determination means 56. In view of the detailed foregoing discussion, only a brief description of the flowchart follows. In said FIG. 10, an initial set of exposure values, one for each coefficient, is assigned and referred to as the present value set in block 146. A done flag is set in block 148 for tracking calculation completion. For each coefficient, starting at the first coefficient, border pixels are assigned in block 150. In block 152, with border pixels known, coefficients for background pixels follow, resulting in exposure values for background pixels from the present value set of exposures. In block 154, the exposure for the plot pixel is obtained using the current coefficient from the present value set.

In blocks 156 and 162, using preferably numerical methods the actual exposed area above threshold is calculated and compared with the ideal area against an allowable difference. Numerical methods used, typically, would subdivide pixels into subpixels and pixel plot times into subpixel plot times performing exposure summations at each subpixel within the summation area.

This technique lends itself to both mathematically defined, as well as empirically measured, beam shapes. For actual and ideal areas failing the compare criteria, preferably a percent or so, an adjustment in plot pixel exposure is made in block 158. Iteration in blocks 156, 158, and 162 using return line 160 continues until a sufficiently accurate match is achieved. The done flag is cleared in block 158 for significant changes, preferably a few percent, in any plot pixel exposure during said iteration. Alternately, clearing of the done flag is based on changes to actual area during the iteration process. Clearing the done flag in block 158 for any one coefficient causes an additional calculation for all coefficients since inaccuracies in background pixel exposures is indicated. When sufficiently accurate, each plot pixel exposure is saved in the next value set at block 164. The present value set is preferably left unmodified.

Blocks 166 and 170 and line 168 advance the computation to the remaining coefficients. Blocks 172 and 174 and line 178 start another computational pass through all coefficients because at least one exposure value was inaccurate. The new pass uses the results of the current pass. Blocks 172 and 176 terminate the computation and accept the exposure value for use in exposure determination means for the selected pixel and beam formats.

Referring to FIG. 3, in the preferred or first embodiment, a plot exposure value representing the required plot beam amplitude appears on lines 66 for each pixel being plotted. Beam modulation means 58 inputs said plot exposure and controls beam amplitude in, preferably, an analog manner represented schematically by line 68.

Note that iteration is typically unnecessary for any coefficient for which the pixels immediately adjacent to the plot pixels are all exposed. In this case, the ideal area typically equals the full area 87 of FIG. 8a and the actual area fills area 87 in FIG. 8b. The value for these specific coefficients can be utilized to independently control the background density in such areas fully populated with exposed pixels of an image and to coverup unexposed streaks which can result from writing beam jitter or other anomalies in those same areas.

In a second embodiment, data storage means 52 and pattern detection means 54 along with interconnections 62 and 64 of FIG. 3 remain the same as in the first embodiment.

Figure 11:
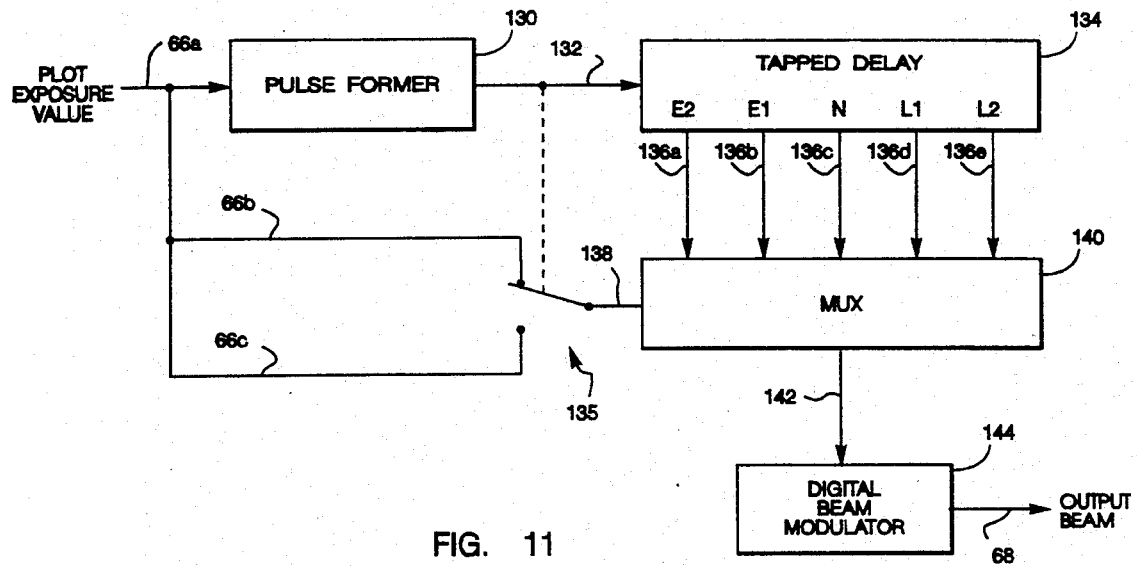
FIG. 11 is a block diagram showing details of a second embodiment.
Figure 12:
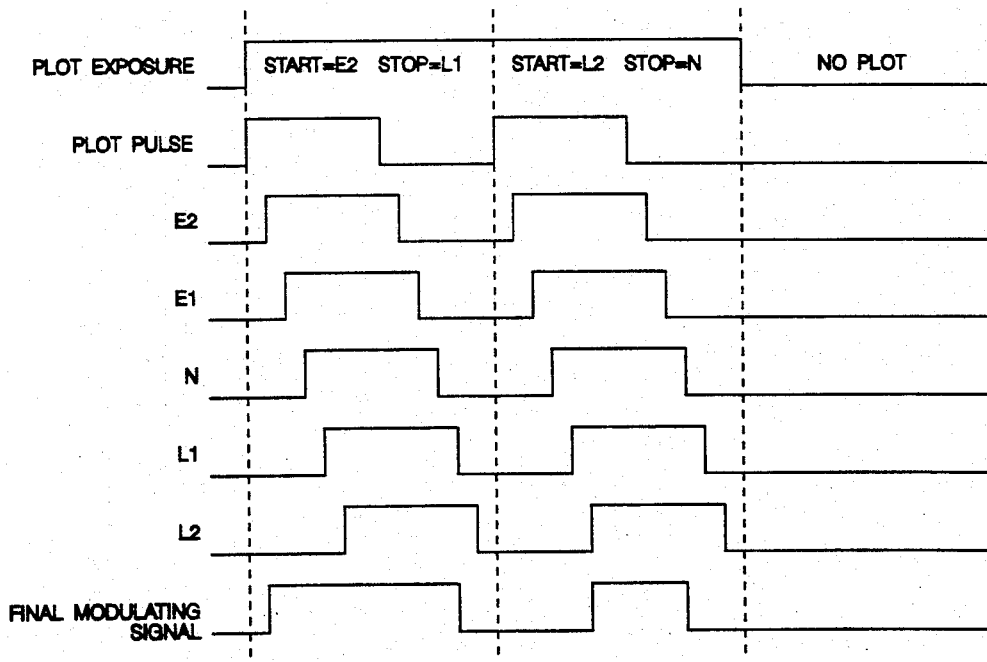
FIG. 12 is a waveform diagram of the second embodiment.

In the second embodiment, plot exposures generated by the computations of the flow chart in FIG. 10, represent the turn-on and turn-off times of a preferably constant beam amplitude at each pixel edge. In this second embodiment, blocks 156 and 158 of FIG. 10 calculate and iterate timing values as opposed to plot amplitudes as in the first embodiment. A beam modulation means 58 in accordance with this second embodiment is shown in FIG. 11, along with timing waveforms which are shown in FIG. 12. The second embodiment includes data storage means 52, pattern detection means 54, exposure determinations means 56, interconnections 62, 64, 66 of the first embodiment, plus a pulse former 130, tapped delay 134, multiplexer 140 with control selector switch 135, and digital beam modulator 144. In FIG. 11, which shows part of this second embodiment, plot exposure lines 66 consist of three components:

1.) The plot/not-plot status of the plot pixel on line 66a, referenced as plot status.
2.) A code representing the start timing of the plot pixel on line 66b referenced as start plot.
3.) A code representing the stop timing of the plot pixel on line 66c referenced as stop plot.

Plot status 66a is applied to pulse former 130 which produces a nominal width plot pulse output on line 132 for each pixel being plotted. Said plot pulse output is received by tapped delay 134 which produces the plot pulse waveform with increasing delays 136a to 136e. For illustrative purposes, five delays are shown; a nominal delay N on line 136c, two early positions E1 and E2 on lines 136a and 136b plus two late positions L1 and L2 on lines 136d and 136e. Typical implementations would provide for more delays preferably 16 to 32.

Lines 136 from tapped delay 134 are applied to multiplexer 140 for selection of the final output digital modulating signal on line 142. Digital beam modulator 144, typically an acousto-optic type, responds in an on/off manner to modulating signal 142. Delay selector switch 135, receives the start plot code on lines 66b and the stop plot code on lines 66c.

A selected delay code is produced on lines 138 and supplied to multiplexer 140 for final timing selection. Selector switch 135 is responsive to the plot pulse signal on line 132 such that when line 132 is in the beam-on state, switch 135 passes the start plot signal 66b to multiplexer 140 via line 138. Alternately when line 132 is at the non-plot state, the stop plot signal on lines 66c passes to line 138.

In the operation of the second embodiment, FIG. 12 shows detailed waveforms for three sequential pixel intervals. In all waveforms the high state represents the beam active or plot state Plot exposure in this example is as follows:

1.) Pixel interval 1, start plot two delays early E2), stop plot one delay late (L1)
2.) Pixel interval 2, start plot two delays late (L2), stop plot normal (N)
3.) Pixel not to be exposed The plot pulse on line 132 is a pulse of constant width typically less than the pixel interval by the amount of delay in the tapped delay 134. Said width and individual delays in tapped delay 134 must match the nominal delays used with the calculation loop of the FIG. 10 flowchart blocks 156, 158, and 162. Delayed waveform E2, E1, N, L1, and L2 logically follow from the above discussion. The output waveform shown results from the dynamic selection by the plot pulse signals of waveforms E2, L1, L2 and N during the first two pixel intervals. During the third pixel interval no plotting occurs.

The operation of the first embobiment or system 51 is described hereafter. Referring to FIG. 3, a system 51 operating within the scope of the present invention, combines a data storage means 52, a pattern detection means 54 an exposure determination means 56, and a beam modulation means 58. Said system produces an output beam 68 capable of writing an image on thresholded media with an accuracy improved to more closely match the desired pattern of data contained in input 60. Data source 60 typically consists of a serial stream representing the intended plot state of pixels. Said data source 60 is applied to data storage means 52 to produce patterns of data surrounding the currently plotting pixel. Pattern detection means 54 preferably reduces the number of patterns on its output lines 64 from that on its input lines 62 to the minimum expected to be uniquely necessary for print correction.

Exposure determination means 56 provides a correcting plot value on its output lines 66 for each pattern input on lines 64 such that the resulting plot area more nearly matches the expected value for each specific pixel shape and writing beam format. Exposure correction for the first embodiment of system 51 includes amplitude information on output lines 66 supplied to beam modulation means 58 capable of modulating the intensity of output writing for said correction of the resultant image. In the second embodiment, lines 66 include timing information applied to a modulator capable of on-off operation at constant amplitude for said correction of printing area.

Although the first and second embodiments of the present invention have been described above, it will be appreciated that such examples are clearly not exhaustive and other alterations and modifications will no doubt become evident to one of ordinary skill in the art after having read this disclosure.

Another alternate embodiment, similar to that in FIG. 11 but using exposure control of only one edge of the plot pixel, would fall within the scope of this invention. The plotting beam of said embodiment would remain on for adjacent pixels plotted consecutively. The calculation loop of FIG. 10 blocks 156, 158 and 162 would have adjusted timing as appropriate.

Because the effects of exposure are cumulative, printing compensation for non-rastered systems can be performed in which the printing beam is positioned over non-adjacent pixels one at a time. The printing beam need not be a beam at all for certain imaged printing mechanisms.

Printing or placing information on thresholded media other than film such as plates, charged drums and phosphors fall within the scope of this invention. This invention is applicable to both sharply of gradually transitional thresholded media.

Alternative beam modulators have imputs for both digital (on/off) and amplitude modulation. Said digital input information for the plot pixel may conveniently bypass pattern means 54 and exposure determination means 56 of FIG. 3.

Embodiments which combine the amplitude modulation of the preferred embodiment with the timing modulation of the second embodiment would fall within the scope of this invention.

The disclosure is intended to be exemplary rather than limiting and the appended claims are intended to cover all alterations and modifications as fall within the true spirit an scope of the invention. The invention is limited only by the scope of the following claims.

What is claimed is:

1. A method for compensating information written on thresholded media comprising the steps of:
   a. determining a result in the vicinity of a plot pixel of writing said plot pixel using a plot pixel writing value from a first set of values and writing surrounding pixel using values from said first set of writing values; selecting plot pixel writing values based on the pattern of said surrounding pixel pattern; selecting surrounding pixel writing values based on the pattern of pixels surrounding each said surrounding pixel; including all significant patterns of surrounding pixels in said first set of values;
   b. comparing said results in said vicinity of said plot pixel against the desired result;
   c. determining a new plot pixel value by iterating until a new result in the vicinity of said plot pixel substantially matches said desired result;
   d. saving said new plot pixel value in a second set of writing values;
   e. repeating steps a. through d. for all said significant patterns of surrounding pixels;
   f. exchanging all values between said first set of writing values and said second set of writing values.
   g. repeating steps a. through f. until the values in said first set of writing values are substantially the same as the values in said second set of writing values; and
   h. using said values in said first or second set of writing values to write each said plot pixel of the data or image as a function of surrounding pixels.

2. The method of claim 1 wherein the writing value is a beam amplitude.

3. The method of claim 1 wherein the writing value is beam timing.

4. The method of claim 1 wherein the writing value is a combination of beam amplitude and beam timing.

5. A writing compensator for thresholded media responsive to surrounding elements, comprising:
   exposure determination means having an input connected to a pattern of surrounding elements and having an output exposure value responsive to said pattern of surrounding elements whereby an area written above a threshold is matched to an intended area;
   beam modulation means having an exposure input connected to the output exposure value of the exposure determination means and a control output, said control output providing a beam control for controlling a beam.

6. The writing compensator of claim 5 wherein the beam modulation means is an amplitude beam modulation means.

7. The writing compensator of claim 5 further comprising a means for writing a plurality of elements wherein said means for writing the plurality of elements is a means for writing adjacent elements consecutively.

8. The writing compensator of claim 5 further comprising a means for writing a plurality of elements wherein said means for writing the plurality of elements is a means for writing non-adjacent elements consecutively.

9. The writing compensator of claim 6 wherein the amplitude beam modulation means includes a direct connection for on/off control of the beam.

10. The writing compensator of claim 5 wherein the beam modulation means is a timing beam modulation means and comprises a means for beam timing adjustment.

11. The writing compensator of claim 5 wherein the exposure determination means provides said output exposure value such that the area written above said threshold is matched to said intended area independent of the pattern of surrounding elements.

12. The writing compensator of claim 5 wherein the exposure determination means includes a means for controlling the output exposure value or exposed elements in fully populated areas whereby background density is controlled and sensitivity to beam jitter is reduced.

13. The writing compensator of claim 10 wherein the beam modulation means comprises:
   a nominal width pulse former having an input connected to the output exposure value of the exposure determination means and having a pulse output, said pulse output supplying a nominal plot pulse;
   a plot signal tapped delay line having an input connected to the pulse output of the nominal width pulse former and having a plurality of delay outputs;
   a selector switch having a first input terminal connected through a start plot signal line to the input of the nominal width pulse former and having a second input terminal connected through a stop plot signal line to the input of the nominal width pulse former and having an output terminal and having a switch arm for alternately connecting the output terminal to either the first input terminal or the second input terminal;
   switch activating means connected to the pulse output of the nominal width pulse former for activating the switch arm;
   a plot signal multiplexer having an input with a code line connected to the output terminal of the selector switch and having a plurality of inputs respectively connected to the plurality of delay outputs of the plot signal tapped delay line and having an output; and
   a digital beam modulator having an input connected to the output of the plot signal multiplexer and having an output, said output providing the beam control for controlling the beam.

14. The writing compensator of claim 5 wherein the beam modulation means is a combination of a timing beam modulation means and an amplitude beam modulation means.

15. A writing compensator for thresholded media responsive to surrounding pixels, comprising:
   pattern detection means having an input connected to a pattern of surrounding pixels and having an output set of coefficients, said output set of coefficients being determined to represent a reduced set of exposure values;
   exposure determination means having an input connected to the output set of coefficients of the pattern detection means and having an output exposure value, said output exposure value being determined such that an area written above a threshold is matched to an intended area;
   beam modulation means having an input connected to the output exposure value of the exposure determination means and an output beam.

16. The writing compensator of claim 15 further comprising a data storage means having an input for receiving data from a serial data source and having an output connected to the input of the pattern detection means wherein said pattern of surrounding pixels is supplied by said data storage means to said pattern detection means.

17. The writing compensator of claim 15 wherein the beam modulation means is an amplitude beam modulation means.

18. The writing compensator of claim 15 further comprising a means for plotting a plurality of pixels wherein said means is a means for plotting adjacent pixels consecutively.

19. The writing compensator of claim 15 further comprising a means for plotting a plurality of pixels wherein said means is a means for plotting non-adjacent pixels consecutively.

20. The writing compensator of claim 17 wherein the amplitude beam modulation means includes a direct connection for on/off control of the output beam.

21. The writing compensator of claim 15 wherein the beam modulation beam is a timing beam modulation means and comprises:
   a nominal width pulse former having an input connected to the output exposure value of the exposure determination means and having a pulse output, said pulse output supplying a nominal plot pulse;
   a plot signal tapped delay line having an input connected to the pulse output of the nominal width pulse former and having a plurality of delay outputs;
   a selector switch having a first input terminal connected through a start plot signal line to the input of the nominal width pulse former and having a second input terminal connected through a stop plot signal line to the input of the nominal width pulse former and having an output terminal and having a switch arm for alternately connecting the output terminal to either the first input terminal or the second input terminal;

switch activating means connected to the pulse output of the nominal width pulse former for activating the switch arm;

a plot signal multiplexer having an input with a code line connected to the output terminal of the selector switch and having a plurality of inputs respectively connected to the plurality of delay outputs of the plot signal tapped delay line and having an output; and a digital beam modulator having an input connected to the output of the plot signal multiplexer and having an output beam.

* * * * *